Jan. 9, 1940.  R. WILDERMANN  2,186,312
WELDING REFRACTORY METAL
Original Filed May 31, 1930  3 Sheets-Sheet 1

INVENTOR
Rudolf Wildermann

Jan. 9, 1940.  R. WILDERMANN  2,186,312
WELDING REFRACTORY METAL
Original Filed May 31, 1930   3 Sheets-Sheet 2

Jan. 9, 1940. R. WILDERMANN 2,186,312
WELDING REFRACTORY METAL
Original Filed May 31, 1930 3 Sheets-Sheet 3

INVENTOR
Rudolf Wildermann

Patented Jan. 9, 1940

2,186,312

UNITED STATES PATENT OFFICE 2,186,312

WELDING REFRACTORY METAL

Rudolf Wildermann, New York, N. Y.

Original application May 31, 1930, Serial No. 458,505. Divided and this application December 16, 1935, Serial No. 54,707. Renewed June 1, 1939

6 Claims. (Cl. 29—155.55)

My invention is a division of United States patent application Serial No. 458,505, filed May 31, 1930, and concerns the contact making method there described. It relates to the manufacture of electrical contacts, which consist of a small element suited to make an electrical contact and of a machine part which that element is made part of. Said element and said machine part are intimately united.

The reason contacts are not made in one homogeneous material is the following: The material used for the element is in some instances very precious, in other instances it is refractory and hard to put through the manufacturing processes commonly known today. A third reason is that the material of the element may not be suited in electrical respects and mechanical properties for the whole machine part.

The machine parts to which the element is fastened to make a contact may take various shapes and it is this shape of the machine part which usually gives to the contact its denomination. Thus, we know contact points, contact rivets, contact studs, contact screws, contact arms, breaker arms, contactors and other contact parts. The particular contact manufacturing methods used until now have largely influenced and controlled the shape of the machine part. In many instances, due to the peculiarities of such methods the element had to be put on a machine part which in turn was made part of another machine part. So for instance, contact arms generally comprise a lever to which a contact point is attached.

The method most commonly used today for uniting certain contact elements to machine parts is brazing. Such brazing is brought about by placing a material which serves as a hard solder upon a machine part, also called blank, and placing the contact element, also called the disc, on top of the solder; these parts are then subjected to a high temperature at which the disc is intimately united with the blank.

Manufacture by brazing starts, therefore, with the manufacture of blanks on which a "table" is shaped with respect to the disc which has to be brazed upon it, and with the preparation of the disc. Particular attention is required for the faces of the table and the disc so that they offer a maximum area for union by brazing.

The disc is ordinarily prepared by transverse slicing of rods. A number of blanks, with the tables up, are set up in suitable jigs, commonly known as "boats." Solder is placed on the table of each blank and a disc is then placed on top of it. Sometimes the arrangement in the boat is reversed, the disc being at the bottom, the solder on top of the disc and the blank on top of the solder.

The boats containing the parts to be brazed to make contacts are subjected to a high temperature, usually in a zone of an inert or reducing gas. It is a peculiar feature of this operation that the discs, when the solder starts to flow, line up coaxially with the table. However, it cannot be avoided that some discs are brazed "off-center" on the table and therefore an inspection of the contacts, after brazing, is required to eliminate those contacts which have not been brazed properly.

The next step in the manufacture consists in removing from the outer surfaces of disc and blank the excess of solder, which has flnown from the point of soldering between the disc and the table during the brazing operation. This ordinarily is a chemical process which must be controlled very carefully so as to remove all solder from the surface and side of the disc,—solder on the contacting surface is very objectionable,—and yet not to remove by these processes the solder holding the blank and the disc together.

In spite of the extreme skill which has been developed in slicing the faces of the disc parallel to each other and brazing such a disc onto the table of the blank so that it comes to rest practically flat, it is desirable to apply afterwards a mechanical facing operation to the surface of a quality contact to have the contact face in a position normal to the axis of the machine part.

It must be noted that the table to which the disc is to be welded should be of the same diameter as the disc in order to bring about a centering in the brazing operation. I also want to call attention to the necessary limitations imposed upon the material used for the machine part by the fact that contacts are exposed to a very high temperature during the brazing operation and even parts which are adapted to stand high temperature will thus be subjected to a change of their charatceristics, e. g. will be tempered, annealed etc.; it is commonly required to apply a special heat treatment to the contacts after the brazing in order to impart to the blank a coating of a lasting oxide and to give the contacts a uniform appearance.

I have found it necessary to go into the foregoing details of the steps of the art of making contacts as used today particularly in connection with so called "tungsten" contacts, in order to be able to bring forth the objects of my invention which are as follows:

1. To produce a contact in which the disc is united to any shape of a blank.
2. To bring about a homogeneous, direct and integral union between the blank and the disc.
3. To be able to weld the contacting part to the blank in the open air.
4. To apply heat only at the point where contacting part and blank are to be united.
5. To do away with solder or flux.
6. To cut the contacting surface on the contacting member after the weld has been performed so that virgin metal may be provided for the contacting surface; and to be able to cut said surface at any angle at which it may be desirable to have it disposed in regard to the blank.
7. To avoid the handling of discs in the manufacture by welding the rod to the blank and shaping said disc from said rod after the welding operation, thus also restricting the handling of the blanks to the one step of the manufacture in which the contact is produced.
8. To be able to feed to a machine the raw material used for the blanks and the rod for the discs and to have the finished contact issue from the machine.
9. To be able to produce the contacts in uninterrupted succession.
10. To facilitate production, from the starting materials, finished contacts by automatic machinery.

The basic feature of my invention is to weld a contact metal rod to a blank then to cut the rod at a suitable point, so that an assembled contact is obtained; this represents a radical departure in the art of making refractory metal or tungsten contacts, in which the contact metal was heretofore always reduced to the proper size, before it was mounted on the blank.

These and other objects of my novel method are most conveniently explained by way of some of the mechanism I may exemplarily use in carrying out my method, as illustrated in the accompanying drawings, in which:

Figures 8 and 9 show side elevations of contact blanks in screw and rivet shape respectively.

Figure 10 is a side view of a finished contact rivet.

Similar numerals refer to similar parts throughout the several views.

Figure 1:
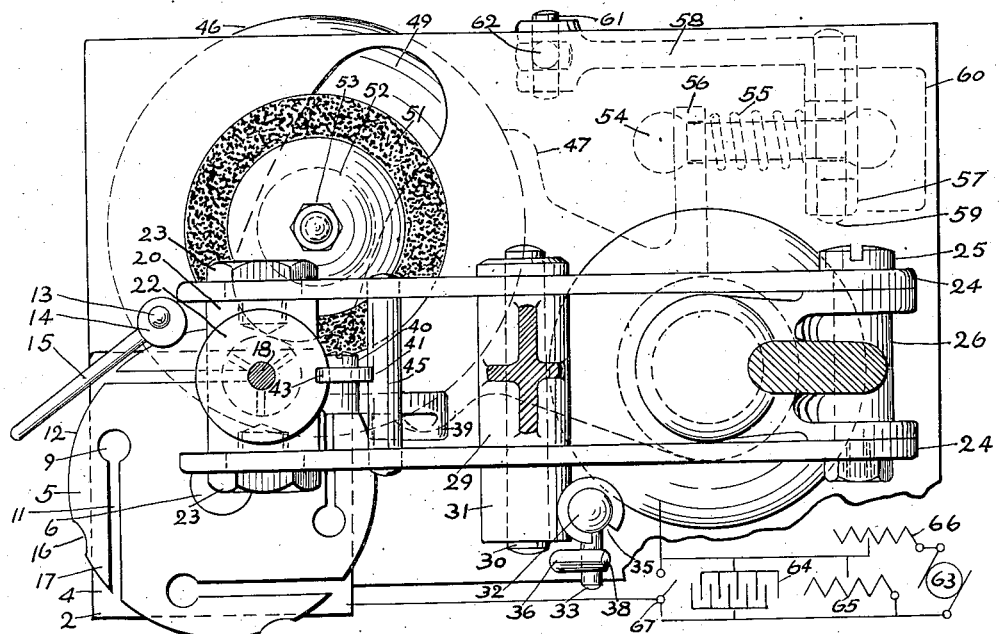
Figures 1 and 2 show top and side views, respectively, of a machine in which the parts of the contact are united in vertical alignment. In the top view part of the top is sectioned away (see section line 1—1 in Fig. 2).
Figure 2:
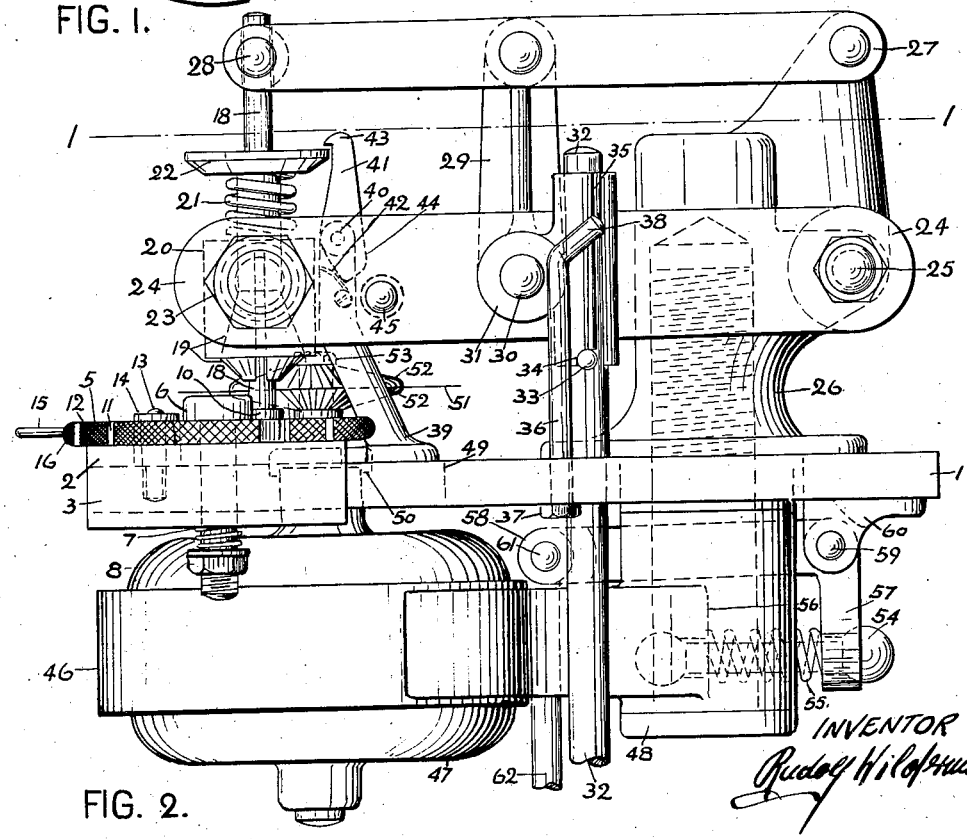

Manufacture in a vertical apparatus (Figures 1 and 2)

On the edge of insulated base plate 1 is mounted metal angle 2. Its vertical plane 3 serves for electric connections. On its horizontal plane 4 the turn-table 5 is mounted, rotatable around screw 6 and tensioned against plane 4 by compression spring 7 between a nut 8 on screw 6 and the bottom of plate 1. The four holes 9 in plate 5 serve to take contact blanks 10. Slots 11 extend from holes 9 to the edge of plate 5. The periphery 12 of plate 5 is knurled in order to offer a grip for the hand to turn that plate.

Rotatable around pin 13 on base plate 1 is the eccentric lock 14 with handle 15. It matches notches 16 in the periphery of plate 5 and, when locked, presses lips 17 which in turn close upon a contact blank 10 inserted in a hole 9. While thus holding the contact blank 10 in plate 5, the lock 14 engaged in notch 16 also locks the rotatable plate 5 in such a position that the contact blank aligns with the refractory metal rod 18.

That rod 18 is chucked by draw-in-collet 19 in square lug 20 and normally is held tight by the tension of compression spring 21 acting on the back end of the collet between the lug 20 and collar 22. By means of shoulder screws 23 lug 20 is rotatably hinged onto the flat copper bars 24 which in turn are, by shoulder screw 25, rotatably hinged upon stand 26.

Stand 26 is mounted on the base plate 1. Straight above shoulder screw 25 two other flat bars 27 are rotatably hinged to the stand 26. They are parallel to bars 24 and, as levers, have the same center distances as those bars 24. Similar to the lug 20 between bars 24 there is a pivoted pin 28 rotatably mounted in the ends of bars 27. A hole through that pin straight above collet 19 serves to guide the refractory metal rod 18. To assure the parallel operation of bars 24 and 27, they are hinged together by connecting rod 29. Shaft 30, onto which that connecting rod hinges between bars 24, carries on the end the lug 31. This lug has a hole perpendicular to shaft 30 in which rod 32 is slidably fitted. The lower end of rod 32 is rotatably hinged to a foot pedal (not shown) so that it is positively raised and lowered by the operation of that pedal; it is rotatable around its own vertical axis in the hinge at the pedal; a tension (not shown), which tends to rotate the rod 32 around its own axis in clockwise direction, is exerted at the pedal by means of a spring. A pin 33 in the rod 32 is pressed by that tension into notch 34 on lug 31; next to notch 34 there is a slot 35 in lug 31 upwardly extending to the length of the hole, into which rod 32 is slidably fitted. A rod 36 parallel to rod 32 is mounted in base plate 1 and locked in position by nut 37. Its upper end 38 is bent. When rod 32, together with lug 31 and bars 24, is raised by the foot pedal, pin 33 strikes bend 38 and is rotated counterclockwise away from notch 34 until it is below slot 35. When that position is reached lever arrangement 24, 27, owing to its weight which may be accentuated by spring tension, drops down, slot 35 clearing pin 33.

Onto the upper end of bracket 39, which is mounted on base plate 1, a lug 41 is hinged around shoulder screw 40. Spring 42 acts against that lug 41 and presses the upper end of hook 43 over collar 22. An extension 44 on lug 41 extends so far as to be struck by rod 45 in lever bars 24 when these bars are lifted.

Below the base plate 1 a high speed motor 46 is mounted on a lever 47. The lever swings around vertical screw 48, which is inserted, through the base plate, into the bottom of stand 26. Its shaft extends through a hole 49 in the base plate 1 and carries, above a hub protecting cap 50, an abrasive cutting wheel 51, clamped onto the shaft between flanges 52 by nut 53.

Ball joint 54, with compression spring 55 in between, connects the extension 56 on lever 47 to angle lever 57, 58 which is fulcrumed at 59 upon a bearing 60 extending down from the base plate. Upon lever arm 58 hinges in 61 the rod 62 which at its lower end is hinged to another foot pedal (not shown).

Direct current sources 63 supplies electrolytic condenser 64. The circuit has rheostats 65 and 66 connected in parallel and series respectively. The condenser has a shortcircuiting switch 67 and is connected to the head and the base of the apparatus by way of stand 26 and angle plate 2 respectively.

*Manufacture in a horizontal apparatus (Figures 3 and 4)*

The gear housing 68 with feet 69 serves as a base for this apparatus. The source of motive power is motor 46 on the platform extension 70 of gear housing 68. The motor shaft 71 carries on one end wheel 72 which, e. g. by belt or silent chain 73, drives wheel 74 on cutting spindle 75. The other end of shaft 71 extends into an extension 76 on housing 68 where, by worm and wormwheel, motion is transmitted to shaft 77 from where by spur gears the motion is further transmitted into the gear housing 68 to drive the cam shaft and, by a Geneva-drive, shaft 78. Shaft 78, a four-stop Geneva follower, carries on its end a round conductive head 79 in which the four bushings 80 are locked by studs 81 and nuts 82. The copper head 79 rotates counterclockwise. The contact blank 83 is dropped into one of the bushings 80 at the top from the feeder tube 84, is carried into the horizontal position facing refractory metal rod 18, in which positi 1 the welding and cutting operations successively take place, and, after another 90° rotation of the copper head, the finished contact 85 drops out. Feeder tube 84, in which are stacked several contact blanks 83, is mounted on a shaft 86, rotatable in a bracket extension 87 on gear housing 68. On the other end of the shaft 86 is mounted a lever 88 which extends into the gear housing where it rests against a cam on the cam shaft. There a rocking motion is imparted to that lever and transmitted to the feeder tube 84, thus motioning the exit of that feeder tube back and forth over the bushing 80 below. The purpose of this motion is to help in the feeding, if the blank to be fed is not lodged properly.

The rod 18 is guided on the left by a bearing 89 with insulating bushing 90. On the other end the rod is gripped in vise 91 which is also insulated from the gear housing by fiber bushings 92 on screws 93 and by fiber plate 94. The jaws 95 of the vise are fastened by screws 96 to slides 97. The two slides 97 contain right and left hand threads, respectively, and are operated by double screw 98, the two ends of which are pivoted and rest in flanges 99 on cross-slide 100. That cross-slide 100 operates on bracket 101 which is fastened, with insulation 94 between, on the bottom of the gear housing 68.

There is a pin 102 in the center of double screw 98, which extends between the fingers of fork 103. That fork 103 is mounted on shaft 104 which is rotatable in bearings 105 on the bottom of bracket 101. By a fiber sleeve 106 the shaft 104 is coupled to shaft 107, which is rotatable in bearing 108 at the bottom of gear housing 68, and which carries on its end a lever 109.

This lever 109 extends into the gear housing 68 where it rests against a cam on the cam shaft. The operation of lever 109 rotates shaft 104 in clockwise direction, the left finger of fork 103 strikes pin 102 which in turn rotates double screw 98 in counterclockwise direction, drawing slides 97 together until jaws 95 firmly grip rod 18. On further clockwise rotation of shaft 105 the pressure of the left finger of fork 103 upon pin 102 overcomes the tension of spring 110 stretched between an extension 111 on bracket 101 and the cross-slide 100, and that cross-slide moves to the right, away from the stop screw 112 set by lock nut 113 in extension 111 on bracket 101.

Angle lever 114 is fulcrumed upon pin 115 in bearing 116 at the bottom of gear housing 68. One of the arms extends into the gear housing against a cam on the cam shaft, the other arm is hinged to connecting rod 117, which at the other end slides in connecting link 118, rotatable on swing bracket 119. There is a compression spring 120 between link 118 and the shoulder 121 on the end of the connecting rod 117 by the tension of which the link is held in abutment against a shoulder 151 on said rod 117.

Swing bracket 119, balanced in the rear by counterweight 122 is rotatable around a shaft 123 set by setscrew 124 in bracket 125 which is a solid part of gear housing 68.

The cutting spindle 75 is rotatably in two bushings 126 clamped into swing bracket 119. Onto one end of that spindle 75 abrasive cutting wheel 51 is clamped between flanges 52 by nut 53. A lock nut 127 bearing against the wheel 74 on the other end of the spindle serves for adjustment of the side play (end thrust) of the spindle.

An alternating current goes through a switch operated by the cam shaft in the gear housing, and through leads 128, 129 to the step-down transformer 130. One terminal of the secondary is connected to the gear housing 68 next to conductive head 79. By means of a selective switch 131, connected to the vise 91, the secondary of the transformer is tapped at points of different potential.

*Miter head*

Figure 3:
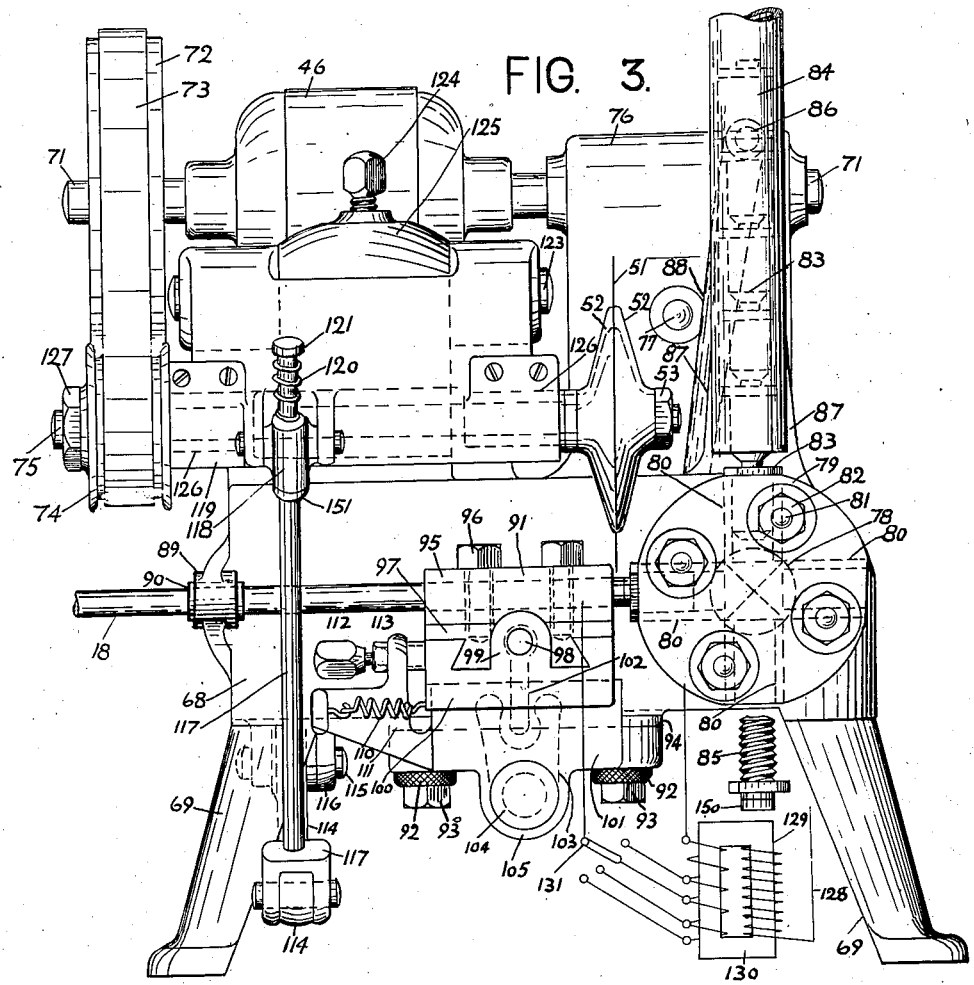
Figures 3 and 4 show, respectively, a front view and a sectioned side view of an automatic mechanism for welding in horizontal position.
Figures 4, 5, 6, 7:
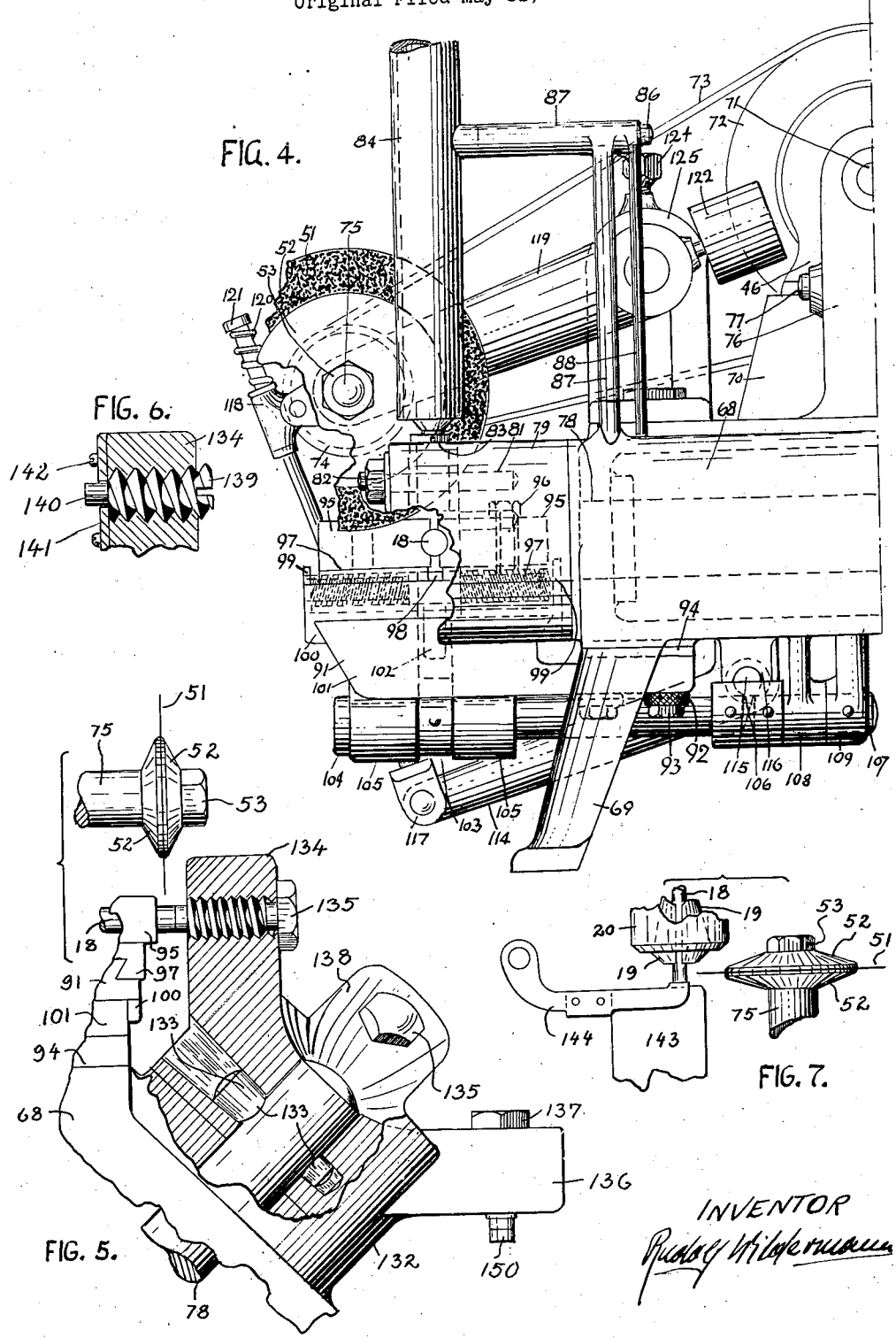
Figure 5 shows a sectioned front view of a different arrangement of parts for executing my invention.
Figure 6 shows a sectional, sectioned view of the arrangement of Figure 5, adapted for the use of different blanks.
Figure 7 shows a sectional view of the application of my invention for the making of breaker arms.

Figure 5 shows a different head for different blanks, which may be substituted in Figures 3 and 4 for head 79. The four-stop-Geneva-follower shaft 78 is placed at an angle of 45°, in which position it is driven from the drive in the gear housing by means of bevel or spiral gearing. The head 132, fastened to the shaft 78 by taper pin 133, has four arms. The front arm is sectioned away. The arm 134 shows the contact blank 135 screwed up to its head into a thread in the arm; (threaded bushings, suited to receive the blanks, may be clamped into the arms). Refractory metal rod 18, clamped into vise 91, faces the blank, to which it is first welded and then it is cut, e. g. by abrasive wheel 51. After the operation is finished and after the arm has swung twice through 90° it reaches the position of arm 136 in which the finished contact 137 is extracted by a vertical semi-automatic socket wrench (not shown) and replaced by a new blank. The arm then travels through the position of arm 138 back to the top position. A four-arm type of a head is shown in order to illustrate the analogy to the device in Figures 3 and 4. In practice only arms 134 and 136 are required and the intermediate arms are omitted.

Figure 6 shows arm 134 of Figure 5 adapted for a different, headless, contact blank 139. The blank may be screwed into the arm by a semi-automatic screw driver so that the shoulder behind the welding table 140 comes to rest against the plate 141 fastened by screws 142 on the arm.

Welding breaker bars

In the arrangement of Figure 7 round plate 5 of Figures 1 and 2 is replaced by a block 143 suited to hold the breaker bar blank 144 onto which the rod 18 is welded and then it is cut by abrasion. The arrangement demonstrates how by my method a finished breaker bar may be produced without making a separate contact point which has to be riveted, driven, spun or screwed into the breaker bar blank.

Figure 8 shows a contact screw blank similar to the one used in the apparaus of Figures 3 and 4 with teat 145 on the welding table 140 as it usually shows on the blank when it comes from the automatic screw machine. The back 146 of the head is the face with which the finished contact face is to be in alignment.

In Figure 9 the welding table 140 of a contact blank has been conically countersunk at 147 leaving a higher rim 148.

Figure 10 shows the enlarged product of the welding-cutting operation in Figures 1 and 2. The refractory metal disc 150 is welded upon blank 10. The shank 149 was clamped in hole 9.

The reader who is familiar with the art of making contacts will have derived from the above that my new method principally relates to the manufacture of contacts with refractory metal tips. The metal most commonly used today is tungsten. My method of welding is an electric butt welding process. An invention on which I have filed Letters Patent at the time of the parent application of the instant application under the title of "Welding refractory metals" and which has in the meantime matured into Patent No. 1,990,314, forms part of the basis on which I carry through this invention. The cutting of tungsten by abrasion as used herein is known in the art of the manufacture of electrical contacts. But the improvements attained by combining this abrasive cutting operation with the other steps of the manufacture are novel and form an essential part of my invention.

The butt welding process can be carried through in two ways: by percussion welding and by the Thompson process. In the drawings the first set-up shows the use of the percussion weld, the set-up of Figures 3 and 4 illustrates the application of the Thompson process. It is clear that the Thompson process can be readily applied for a set-up like that of Figures 1 and 2, and vice versa, I may produce by butt weld in Figures 3 and 4 by percussion welding.

Percussion welding of contacts

Blanks like the one used for the contact shown in Figure 10 are inserted in the holes 9 of plate 5. The plate is turned around screw 6 so that one blank is located below collet 19 and by turn of the eccentric lock 14, which in that position of plate 5 faces one of the notches 16, one lip 17 is clamped to grasp that blank which is below the collet and firmly holds the plate and the blank in that position. I insert the rod 18 through the hole in 28 into the back of collet 19. It will not slide through the hole in that collet because normally it is closed by the tension of spring 21, but if I now lift up rod 32 by foot pedal operation the lever arrangement 24, 27 swings upward and collar 22 is pressed against hook 43 mounted on the stationary bracket 39.

Thus the spring 21 is compressed and the collet is "released" and open. Rod 18 slides down through the collet and comes to rest upon the blank in plate 5. As I further lift up the levers 24, 27 the rod 45 strikes extension 44 on lug 41, rotates it in clockwise direction until the hook 43 is disengaged from collar 22, spring 21 is released and the collet closes upon the rod 18. By continuing the lifting of the lever arrangement 24, 27 rod 18, grasped in collet 19, is lifted away from the blank. Up to this time of the operation the charges produces in condenser 64 from the current source 63 have been shortcircuited through switch 67. I now open that switch and the opposing charges are distributed through the parts of the machine to plate 5 with the blank, and to the rod 18, respectively. I continue the lifting of the lever system 24, 27 until pin 33 strikes bend 38; the rod 32 is thereby rotated in counterclockwise direction until pin 33 disengages from notch 34 and the lever arrangement drops down, rod 18 and the contact blank below come into percussive engagement, condenser 64 is discharged and the heat thus concentrated at the point of contact between the rod and the blank is sufficient to produce a perfect weld at that point. Then I close switch 67 thus diverting the charges of the condenser from the machine. By foot pedal operation I lift up rod 62, thus swinging, in counterclockwise movement around vertical screw 48, the abrasive wheel rotating at high speed on the end of motor 46 towards a point slightly above the percussion weld produced before. By continuation of the foot pedal operation I abrasively cut the rod 18 at that point and then I release said foot pedal. The contact has been made.

I disengage the lock 14 from the plate and turn the plate in clockwise direction through 90° until the next blank comes to rest below the collet. The previously welded contact may now be removed from the plate and a new blank may be inserted in its place. If the foot pedal on 32 is now released, rod 32 slips down in lug 31 and pin 33 again engages in notch 34. Starting now the operation anew by lifting up that rod and thus swinging up the lever arrangement 24, 27, the collet 19 is again released at a certain point, rod 18 drops down upon the blank below the collet and I proceed in the welding of another contact in the manner described before.

By reversing the foot pedal action on 32 and by fastening that rod 32 solidly in lug 31, I can arrange to have the lever arrangement brought down by positive pressure, pressing rod 18 upon the contact blank. If I now replace the electric system by the secondary of a step-down transformer and if I momentarily energize that secondary circuit while, by foot pressure, rod 18 is held in abutment upon the blank, a resistance weld is produced at the point of contact and as a next step of the operation a tip is shaped upon the top of the contact blank by abrasive cutting as described above. Such use of this device for a butt weld by the Thompson process can, therefore, be easily brought about.

A direct illustration of the way in which I butt weld by the Thompson process is contained in Figures 3 and 4. This method is described below.

Butt welding contacts by the Thompson process

A device like the one shown in Figures 3 and 4 may be completely automatic. The operations comprised in it are: the electric welding process, the cutting process, the automatic charge of materials into the machine and the discharge of the finished contact. The first of these steps is carried through according to any of the various butt welding methods known today. The second step involves the use of a high speed slitting saw. In making a contact with a tip of hard material, like tungsten or other refractory metal in the art to which this invention is directed the cutting is done in accordance with present day practice by abrasive wheels.

The third and fourth steps, the charge and discharge, are subject to large variations according to the shape of the finished contact. The charging operation may comprise some mechanical operations upon the blank or it may even comprise the shaping of the complete blank. In the particular instance shown in Figures 3 and 4 the blank is a screw blank of the type shown in Figure 8. Such blanks are stored, one upon the other, in tubing 84. They may be fed to said tubing by a hopper feed or any other one of the feeding mechanisms which have been so highly developed at the present state of the art of automatic machinery. By means of arm 88 a light rocking motion is transmitted to the tubing from the driving mechanism inside of the box 68, by means of which the lower exit of the tubing moves back and forth over the hole in bushing 80 so that the blank at said exit is rocked into said hole and the threaded end of the screw slides into it, until the hexagon shoulder comes to rest upon the face of said sleeve 80.

By a rotation of the conductive (copper) head 79 through 90° in a counterclockwise direction the screw blank just fed into it is swung into a horizontal position facing rod 18 in vise 91. Lever 109 now comes into action rotating in clockwise direction, following a cam on the cam shaft in housing 68. This brings the left finger of fork 103 to bear upon 102, it rotates the double screw 98 whereby the slides 97 are brought together and the jaws 95 firmly grip rod 18. Upon further rotation of shaft 104 the pressure of the left finger of fork 103 upon pin 102 overcomes the tension of spring 110 and cross-slide 100 moves toward the copper head until the rod 18 is held, under pressure, in firm abutment against the blank 83. This tension is maintained throughout the welding process.

In my welding process, as mentioned before, I follow the general principles laid down in Letters Patent on improvements in "Welding refractory metal," Patent No. 1,990,314 of February 5, 1935; the rod 18 is arranged to protrude from the vise 91 to such a length that under the application of a welding current a reserve heat is produced in rod 18 between the vise and the contact blank, which yields the heat required for a perfect weld between the rod and the blank.

The cam operated switch in the housing 68 closes the primary circuit of the leads 128, 129 on the transformer. The weld requires a very short period of time and the primary current is opened after the required welding heat has been produced. The timing on the cam furnishes rough adjustment for the welding period whereas the tapping facilities at 131 furnish additional means of regulating the heat produced in the secondary.

After the weld is finished the pressure by the finger on part 103, which tensions the vise towards the conductive head, is released by a fractional counterclockwise rotation of lever 109 from the cam in the housing. Now lever 114 is actuated from the cam shaft and the swing bracket 119 is pulled down by the action of said lever so that cutting wheel 51 comes into abrasive contact with rod 18 and the downward movement of the swing bracket continues slowly while the abrasive wheel severs the rod 18 from the contact.

As known to those acquainted with the art of abrasively cutting refractory metals, cooling means are required at the point of abrasive cutting. These means are not shown because they do not represent any improvements in the art. They may be brought about by a stream of water from a spout which automatically is shifted, at the time of cutting, into position so that a spray of water plays on the parts to be cut, or the water spout may be solidly mounted on the swing bracket, thus coming to play upon the parts to be cut when the swing bracket is swung down for the cutting, the water being automatically shut off when the swing bracket is removed from the cutting position. I do not necessarily resort to water for the cooling but I may use an inert gas, or hydrogen, nitrogen, or a mixture of the two.

After the cutting operation has been carried through the swing bracket swings back, upwards, into its normal position and the cooling means are diverted or shut off.

The contact being finished, head 79 is swung through another 90° in counterclockwise direction. The finished contact 85 with the tip 150 drops out of sleeve 80 which now is pointing vertically down; another blank has been brought from the top, feeding, position to face the rod 18 in vise 91. The sleeves 80 are removable mounted in the copper head by lock studs 81 so that they may be readily exchanged to fit the outside diameter of the shank of the various types of contacts which are to be welded in this machine. These sleeves are preferably made out of welding alloys of the type developed for electrodes or holding clamps for resistance welding apparatus.

The shaft 104 rotates in counterclockwise direction allowing the vise to slide away from the copper head along cross-slide 100. When that slide comes to a stop by striking stop screw 112, the further counterclockwise rotation of the shaft 104 will bring the right finger of part 103 to bear upon pin 102, the double screw opens up the vise and rod 18 is released. That rod, being under the pressure of tensioning means at its end which tend to slide it from the left to the right, will, upon being released, slide towards the new blank facing it and come to a stop in abutment with the face of that blank. The automatic mechanism will now continue the repetition of the operations outlined above, i. e. shaft 104 will again rotate in clockwise direction, clamping the rod, and pressing it upon the blank, a weld is made, the abrasive cutting operation is repeated and again, during or after a 90° counterclockwise rotation of the copper head, the finished contact drops out of the machine and a new blank is brought into position.

There are, of course, many shapes of contacts used which all may be handled by my machine. In the description of the parts the welding head of Figure 5 has been described so that its function does not have to be detailed. It may simply take the place of the copper head in Figure 3, and is driven from below instead of being driven from the back. It may readily be seen that a regular screw machine may be coupled to my apparatus in such a way that, after the blank has been prepared by the screw machine, it is immediately welded to the refractory metal rod and the tip is cut upon the blank by abrasion.

The arrangement of Figure 7 is shown in a vertical position and may therefore, by way of replacement, be operated according to the arrangement of Figures 1 and 2. Arranging the block 143 so that it faces vise 91 of Figure 3 I may weld breaker arms in the horizontal machine.

Blanks ordinarily have a teat 145 on the face after they leave the screw machine. The old welding methods require an extra operation, taking off that teat, or even slightly concaving the blank so that the face assumes the shape shown in Figure 9. This special facing operation is not necessary for the blanks used in my improvements. The welding heat quickly melts the teat away and, under the pressure exerted, the rod and the blank come immediately to rest upon each other in full abutment and are welded together. It is, of course, desirable that the operation of making the blanks is controlled in such a way that the teats 145 are uniform so that they do not prevent, by unequal resistances, the proper timing of the welding.

I do not want to limit myself to any particular shape of blank, but in welding very large contacts I may shape the face of the blanks similar to the face of the blank of Fig. 9. In making breaker arms I may also resort to such steps of raising or lowering of the metal at the point where I weld the disc to it as are frequently employed in the processes of welding sheet metals.

Having thus illustrated and described my process of making electric contacts by butt-welding processes, I do not want to limit the scope of my invention to the welding of contacts, I may use these methods for uniting the disc to the contact blank in other ways. So for instance, it may be advisable,—in order to reduce the temperature to which the parts have to be heated and, correspondingly, in order to reduce the welding current,—to electroplate the blanks before they are united with the rod from which the disc is to be cut, I use silver, copper or other brazing materials for that plating, or introduce such material or merely flux between the rod and blank for welding, as it suggests itself in the light of the prior art. After the welding or brazing operation the rod is cut, thus producing the contact.

The importance of regulating the heat distribution by proper means for the timing of the welding process is still greater when the blank consists of metals of lower melting point such as brass, copper, etc. A resistance weld, under those circumstances, requires special care in timing the making and breaking of the current within a fraction of a second.

Summing up I attribute the success of my novel method for making contact points to the localization and proper distribution of an instantaneous welding heat, to the welding of the contact metal to the backing in the form of a rod, but, above all, to the severance of the tip from said rod after it has been attached to the backing, the arrangement of the parts for expeditious manufacture being brought about in the manner illustrated or in any other manner suggesting itself to those experienced in the refractory metal art.

What I claim is:

1. Making an electrical contact having a backing with a tungsten-type metal contact tip, comprising assembling a rod of said metal to the material of said backing and then providing said tip by cutting across said rod, while said material and said rod are held in their assembled alignment.

2. Making an electrical contact having a backing with a tungsten-type metal contact tip, comprising attaching a rod of said metal to the material of said backing, and then providing said tip and a square face on said tip by cutting normally to and across said rod while holding said material and said rod in their assembled alignment.

3. Making an electrical contact having a backing with a tungsten-type metal contact tip, comprising attaching a rod of said metal to the material of said backing, and then providing said tip by abrasively cutting across said rod while said backing and said rod are held in assembled alignment.

4. Making an electrical contact having a backing with a tungsten-type metal contact tip, comprising attaching a rod of said metal to said backing, and then providing said tip by cutting said rod off at a distance from said backing equal to the desired thickness of said finished tip while holding said backing and said rod in assembled alignment.

5. Making an electrical contact having a backing with a tungsten-type metal contact tip, comprising pressing a rod of said metal onto said backing and welding them together, releasing said pressure, and then providing the desired thickness of finished tip on said backing by cutting the rod while the backing and rod are retained in their welded alignment.

6. Making an electrical contact having a backing with a tungsten-type metal contact tip, comprising pressing a rod of said metal onto said backing and uniting them to each other, releasing said pressure, and then providing the desired thickness of the finished tip on said backing by cutting the rod while the backing rod are retained in the alignment in which they were united to each other.

RUDOLF WILDERMANN.